US009055534B2

(12) United States Patent
Kim et al.

(10) Patent No.: US 9,055,534 B2
(45) Date of Patent: Jun. 9, 2015

(54) METHOD FOR DETERMINING TRANSMISSION POWER FOR TRANSMITTING UPLINK SIGNALS BETWEEN TERMINALS IN A WIRELESS COMMUNICATION SYSTEM THAT SUPPORTS TERMINAL-TO-TERMINAL COMMUNICATION, AND APPARATUS THEREFOR

(75) Inventors: Dongcheol Kim, Gyeonggi-do (KR); Hangyu Cho, Gyeonggi-do (KR); Kyujin Park, Gyeonggi-do (KR); Jiwoong Jang, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 147 days.

(21) Appl. No.: 13/978,913

(22) PCT Filed: Jan. 10, 2012

(86) PCT No.: PCT/KR2012/000233
§ 371 (c)(1),
(2), (4) Date: Jul. 10, 2013

(87) PCT Pub. No.: WO2012/096493
PCT Pub. Date: Jul. 19, 2012

(65) Prior Publication Data
US 2013/0295983 A1      Nov. 7, 2013

Related U.S. Application Data

(60) Provisional application No. 61/431,052, filed on Jan. 10, 2011.

(51) Int. Cl.
*H04W 52/14*      (2009.01)
*H04W 52/38*      (2009.01)
*H04W 52/24*      (2009.01)

(52) U.S. Cl.
CPC .......... *H04W 52/146* (2013.01); *H04W 52/241* (2013.01); *H04W 52/246* (2013.01); *H04W 52/383* (2013.01)

(58) Field of Classification Search
CPC . H04W 52/146; H04W 72/02; H04W 76/023; H04W 88/08; H04W 24/02
USPC .......... 455/522, 67.11, 13.4, 127.1; 370/318
See application file for complete search history.

(56) References Cited

U.S. PATENT DOCUMENTS

| | | | | |
|---|---|---|---|---|
| 8,792,533 | B2 * | 7/2014 | Kizu et al. | 375/135 |
| 2002/0049068 | A1 * | 4/2002 | Koo et al. | 455/522 |

(Continued)

FOREIGN PATENT DOCUMENTS

| | | |
|---|---|---|
| KR | 10-2009-0121323 A | 11/2009 |
| WO | 03/017688 A2 | 2/2003 |

OTHER PUBLICATIONS

Written Opinion issued in corresponding International Patent Application No. PCT/KR2012/000233 dated Sep. 24, 2012.

(Continued)

*Primary Examiner* — Minh D Dao
(74) *Attorney, Agent, or Firm* — Morgan, Lewis & Bockius LLP

(57) ABSTRACT

Disclosed is a method for determining transmission power for transmitting uplink signals between terminals in a wireless communication system that supports terminal-to-terminal communication, and an apparatus therefor. A method in which a first terminal determines transmission power for transmitting an uplink signal to a second terminal in a wireless communication system that supports terminal-to-terminal communication comprises the following steps: estimating a channel state based on a second terminal-specific signal received from the second terminal; transmitting the estimated channel information to a base station; receiving a message, including information on a transmission power control factor, from the base station or from the second terminal; and determining transmission power for transmitting an uplink signal to the second terminal based on the received message.

12 Claims, 3 Drawing Sheets

(56) References Cited

U.S. PATENT DOCUMENTS

| | | |
|---|---|---|
| 2002/0111183 A1 | 8/2002 | Lundby |
| 2006/0188004 A1* | 8/2006 | Kizu et al. ............... 375/132 |
| 2008/0200203 A1 | 8/2008 | Malladi et al. |
| 2008/0207150 A1* | 8/2008 | Malladi et al. ............ 455/127.1 |
| 2009/0325625 A1* | 12/2009 | Hugl et al. ............... 455/522 |
| 2010/0261469 A1* | 10/2010 | Ribeiro et al. ............ 455/423 |
| 2011/0176498 A1* | 7/2011 | Montojo et al. ........... 370/329 |
| 2011/0182280 A1* | 7/2011 | Charbit et al. ............ 370/350 |
| 2011/0275361 A1* | 11/2011 | Yavuz et al. ............. 455/422.1 |
| 2013/0053050 A1* | 2/2013 | Kang et al. .............. 455/452.1 |
| 2013/0178221 A1* | 7/2013 | Jung et al. ............... 455/450 |
| 2013/0272262 A1* | 10/2013 | Li et al. .................. 370/330 |
| 2014/0177537 A1* | 6/2014 | Novak et al. ............. 370/329 |
| 2015/0024802 A1* | 1/2015 | Callard et al. ............ 455/561 |

OTHER PUBLICATIONS

International Search Report issued in corresponding International Patent Application No. PCT/KR2012/000233 dated Sep. 24, 2012.

* cited by examiner

METHOD FOR DETERMINING TRANSMISSION POWER FOR TRANSMITTING UPLINK SIGNALS BETWEEN TERMINALS IN A WIRELESS COMMUNICATION SYSTEM THAT SUPPORTS TERMINAL-TO-TERMINAL COMMUNICATION, AND APPARATUS THEREFOR

TECHNICAL FIELD

The present invention relates to a wireless communication, and more particularly, to a method of determining a transmit power for an uplink signal transmission between user equipments in a wireless communication system supportive of M2M (machine to machine) communication and apparatus therefor.

BACKGROUND ART

In a short range communication system, a machine-to-machine (hereinafter abbreviated M2M) communication is generally defined as a peer-to-peer communication. In this communication system, communication entities perform a mutual communication in accordance with a mutually defined and agreed random access protocol. And, it is not necessary to consider whether one of the entities is actually connected to a public internet network. On the other hand, a communication on a cellular network should be defined as a communication between a base station and a user equipment or a communication between an entity equivalent to a base station and a user equipment, and all communication behaviors are controlled by a base station or an entity equivalent to the base station.

In this protocol, a cellular network restricts operations of all user equipments by a predetermined rule, thereby obtaining maximum throughput. On the contrary, this rule has an over-ruled aspect depending on an application or a channel environment of a user equipment. For instance, a base station makes a decision of a power consumed for a user equipment to transmit the same data traffic. As all behaviors of the user equipment in transmitting the same data traffic are controlled or regulated by a base station, a short range communication should operate in a manner that the base station is situated in-between. Thus, in order for a user equipment to perform a short range communication with low power consumption, the user equipment should have a structure of utilizing another radio resource access technology (RAT) or has no choice but to accept the inconvenience of a cellular network.

Due to such a structural problem, as a channel environment of a user equipment is vulnerable, when the user equipment accesses a network, the user equipment accesses the network by searching for a new access path with restriction put on using an optimal communication path. This problem restricts the following advantages. In particular, if a user equipment has a good channel state with a neighbor user equipment despite being located in a shadow area, the user equipment communicates with the neighbor user equipment and the neighbor user equipment having a good channel communicates with a base station. Therefore, power efficiency and throughput of the user equipment, which becomes a source of data traffics, can be enhanced.

For another instance, if a user equipment intends to communicate with a neighbor user equipment by utilizing RAT of a cellular network instead of using an RAT different from that of the cellular network, the corresponding data exchange is controlled by a base station. Yet, in this communication structure, the corresponding data should be forwarded to a base station and is then retransmitted to a target user equipment no matter how much the user equipments are located physically closer to each other. Hence, this structure may turn out to be an unreasonable communication structure.

According to this application, when user equipments (e.g., M2M (machine to machine) devices) are present and managed, it is able to consider a model in which a specific device plays a role as an aggregator while a server (e.g., M2M server) accesses each of the user equipments via a base station. According to another application, in case that an owner supposed to manage user equipments manages the corresponding user equipments in a manner of being adjacent to them, it is preferable that data is directly delivered to the managed user equipment of the owner rather than delivered to a base station. In doing so, compared to a case of using a different RAT (e.g., WiFi, Bluetooth, Zigbee, etc.), this case can configure an inexpensive ecosystem because a user equipment needs not to include a modem for multiple RATs. Moreover, since the multiple RATs are not used, it may be unnecessary to implement a processing configuration for unnecessary application layers.

Moreover, in designing a radio interface (air-interface) for an M2M communication or a UE-to-BS (user equipment to base station) communication based on a single RAT, it is able to overcome the inefficiency in designing the radio interface based on multiple RATs independently. In particular, if a short range communication and a cellular network access are allowed by utilizing a single RAT, it is able to configure a very efficient ecosystem of user equipments.

The above-mentioned features are applicable to HTC (human type communication) devices as well as to M2M devices or user equipments. In this case, both a short range communication and a long range communication can be performed via a user equipment with small power and low complexity. And, an active QoS management is enabled to achieve an efficient power consumption level and an efficient throughput management.

In this situation, however, a detailed method of supporting a transmit power configuration for a mobile relaying or an M2M communication except a BS-to-UE communication in a cellular network based communication system has not been proposed yet. If the transmit power configuration for the BS-to-UE communication is used as it is, since it is unable to configure a power optimized for an M2M link, it may become inefficient. Therefore, the demand for a method of maximizing the advantages of the M2M communication using the efficient M2M power configuration is rising.

DISCLOSURE OF THE INVENTION

Technical Tasks

One technical task of the present invention is to provide a method of determining a transmit power for an uplink signal transmission from a first user equipment to a second user equipment in a wireless communication system supportive of an M2M communication.

Another technical task of the present invention is to provide a first user equipment for determining a transmit power for an uplink signal transmission to a second user equipment in a wireless communication system supportive of an M2M communication.

Technical tasks obtainable from the present invention may be non-limited by the above mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of determining an uplink transmit power by a first user equipment for an uplink signal transmission to a second user equipment in a wireless communication system supportive of a UE-to-UE communication, according to one embodiment of the present invention may include the steps of estimating a channel state based on a second user equipment-specific signal received from the second user equipment, transmitting estimated channel information to a base station, receiving a message including information on a transmit power adjusting factor from the base station or the second user equipment, and determining transmit power for the uplink signal transmission to the second user equipment based on the received message. the first user equipment identifies the second user equipment based on the second user equipment-specific signal. The second user equipment-specific signal may correspond to an SRS (sounding reference symbol) signal. The method may further include the transmitting an uplink signal to the second user equipment at the determined transmit power. The message may further include information for the UE-to-UE communication.

To further achieve these and other advantages and in accordance with the purpose of the present invention, a method of determining an uplink transmit power determined by a first user equipment for an uplink signal transmission to a second user equipment in a wireless communication system supportive of a UE-to-UE communication, according to another embodiment of the present invention may include estimating a channel state based on a second user equipment-specific signal received from the second user equipment, determining transmit power for the uplink signal transmission to the second user equipment based on the estimated channel state, and transmitting an uplink signal to the second user equipment in accordance with the determined transmit power. The channel state estimating may further include estimating at least one of a pathloss between the first user equipment and the second user equipment and an NI (noise and interference) level.

To further achieve these and other advantages and in accordance with the purpose of the present invention, a first user equipment for determining a transmit power for an uplink signal transmission to a second user equipment in a wireless communication system supportive of a UE-to-UE communication, according to one embodiment of the present invention may include a processor configured to estimate a channel state based on a second user equipment-specific signal received from the second user equipment, a transmitter configured to transmit estimated channel information to a base station, and a receiver configured to receive a message including information on a transmit power adjusting factor from the base station or the second user equipment, wherein the processor determines transmit power for the uplink signal transmission to the second user equipment based on the received message.

To further achieve these and other advantages and in accordance with the purpose of the present invention, a first user equipment for determining a transmit power for an uplink signal transmission to a second user equipment in a wireless communication system supportive of a UE-to-UE communication, according to another embodiment of the present invention may include a processor configured to estimate a channel state based on a second user equipment-specific signal received from the second user equipment, the processor configured to determine transmit power for the uplink signal transmission to the second user equipment based on the estimated channel state and a transmitter configured to transmit an uplink signal to the second user equipment in accordance with determined transmit power. The processor may estimate at least one of a pathloss between the first user equipment and the second user equipment and an NI (noise and interference) level.

Advantageous Effects

According to the present invention, in a cellular network based communication system, a transmit power for a mobile relaying or an M2M communication is efficiently set as well as for a BS-to-UE (base station to user equipment) communication and a communication is correspondingly performed, whereby communication performance can be further enhanced.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Figure 1:
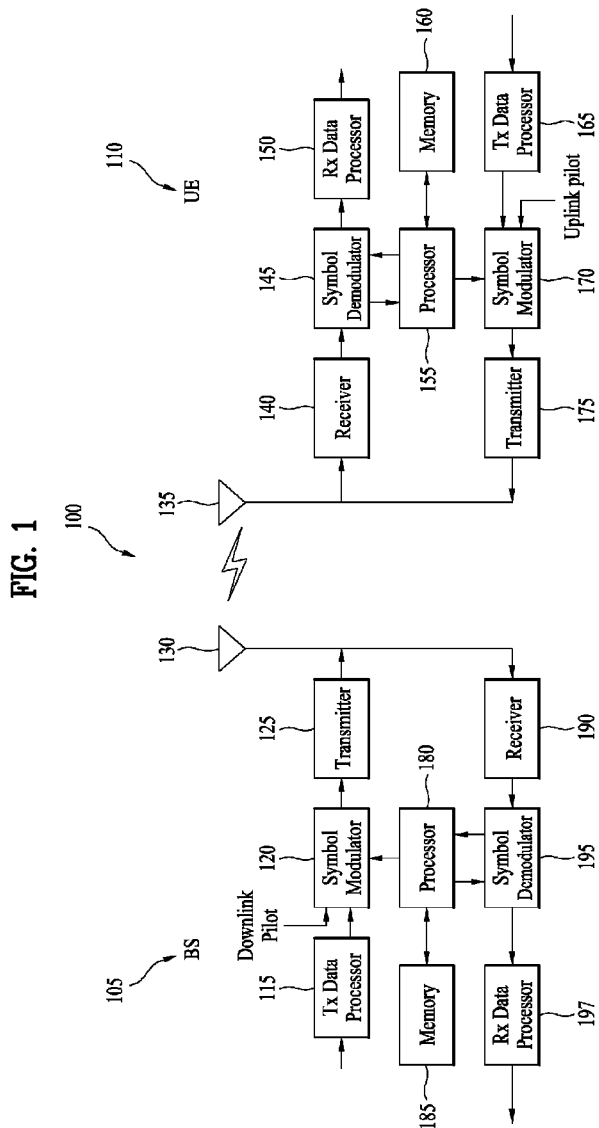
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like.

In a mobile communication system, a user equipment is able to receive information in downlink and is able to transmit information in uplink as well. Informations transmitted or received by the user equipment node may include various kinds of data and control informations. In accordance with types and usages of the informations transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL. And, LTE-A (LTE-Advanced) is an evolved version of 3GPP LTE.

For clarity, the following description mainly concerns 3GPP LTE/LTE-A. Yet, the technical idea of the present invention is non-limited by such a wireless communication system only. Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment and an base station may be classified into first layer L1, second layer L2 and $3^{rd}$ layer L3 based on 3 lower layers of OSI (open system interconnection) model well known to communication systems. A physical layer belongs to the first layer and provides an information transfer service via a physical channel. RRC (radio resource control) layer belongs to the $3^{rd}$ layer and provides control radio resourced between UE and network. A user equipment and a base station can exchange RRC messages with each other via radio communication layer and RRC layers.

In the following description, a method for a user equipment to determine an uplink (UL) transmit power used for an uplink (UL) signal transmission in such a mobile communication system as IEEE 802.16m system is explained in brief Generally, when a user equipment transmits a UL signal, it may need to determine a UL transmit power value. Formula 1 in the following is an expression used by a user equipment to determine a UL transmit power.

$$P(dBm) = L + SINR_{Target} + NI + Offset \quad \text{[Formula 1]}$$

In Formula 1, P indicates a transmit power level (dBm unit) per a subcarrier and stream for a current transmission and L indicates a current average DL propagation loss estimated by a user equipment. The L includes a transmitting antenna gain of the user equipment and a path loss. $SINR_{target}$ indicates a target UL SINR value received from a base station. NI indicates an average noise and interference level (dBm unit) per subcarrier estimated by the base station and is a value received from the base station. Offset is a corrected term for a power offset per user equipment. This offset value is transmitted from the base station through a power control message. There are two kinds of offset values. One is an offset value $Offset_{data}$ used for a data transmission, while the other is an offset value $Offset_{control}$ used for a control information transmission.

In applying Formula 1, a user equipment can directly apply a corresponding target signal to interference plus noise ratio (SINR) value in case of a control channel. Yet, in case of transmitting data, it may be necessary to set up a target SINR value using Formula 2 in the following.

$$SINR_{Target} = \quad \text{[Formula 2]}$$
$$10\log 10\left(\max\left(10 \wedge \left(\frac{SINR_{MIN}(dB)}{10}\right), \gamma_{IoT} \times SIR_{DL} - \alpha\right)\right) -$$
$$\beta \times 10\log 10(TNS)$$

In Formula 2, $SINR_{MIN}(dB)$ is a minimum SINR value requested by a base station and is a value set through a unicast power control message. The $SINR_{MIN}$ is expressed as 4 bits, and its value can become one of $\{-\infty, -3, -2.5, -1, 0, 0.5, 1, 1.5, 2, 2.5, 3, 3.5, 4, 4.5\}$ for example. $SIR_{DL}$ means a ratio of a DL signal measured by a user equipment to an interference power. $\gamma_{IoT}$ is a fairness and IoT control factor and is broadcasted by a base station. The $\alpha$ is a coefficient depending on the number of receiving antennas of a base station. The $\alpha$ is signaled with 3 bits by MAC power control mode signaling and a corresponding value may be expressed as one of $\{1, \frac{1}{2}, \frac{1}{4}, \frac{1}{8}, \frac{1}{16}, 0\}$ for example. The 13 may be set to 0 or 1 by 1-bit MAC power control mode signaling. TNS is the total number of streams in LRU (Logical Resource Unit) indicated by UL-A-MAP IE. In case of SU-MIMO (Single User-MIMO), this value is set to Mt. In this case, the Mt is the number of streams per user. In case of CSM, this value is set to TNS and indicates the total number of streams. In case of a control channel transmission, this value may be set to 1.

A conventional communication was mainly a communication performed between a user equipment used by a user and a base station. Yet, the development of communication technologies has enabled a machine-to-machine communication. The machine-to-machine (hereinafter abbreviated M2M) communication literally means a communication between one electronic device and another electronic device. In a broad sense, the M2M communication may mean a wire/wireless communication between electronic devices or a communication between a human-controllable device and a machine. Recently, the M2M communication may generally indicate a communication between electronic devices, i.e., a device-to-device wireless communication.

In the early 1990's, in which the concept of the M2M communication has been initially introduced, the M2M communication has been recognized as remote control or telematics and derivative markets of the M2M communication were very limitative. Yet, the M2M communication has grown rapidly for past few years and has been introduced into the globally noteworthy markets as well as Korean market. Specifically, in POS (point of sales) and security related application markets, the M2M communication has considerable influence on such field as fleet management, remote monitoring of machinery and equipment, smart meter for auto-measurement of operating time, consumed heat or electricity quantity on construction machinery equipment and the like. M2M communication in the future will be further utilized for various usages in connection with small-scale output communication solutions for conventional mobile communication, wireless high-speed internet, Wi-Fi, ZigBee and the like and may lay the foundation of expansion to B2C (business to consumer) markets instead of being confined to B2B (business to business) markets.

In the era of the M2M communication, every machine equipped with SIM card enables data transmission and reception and is capable of remote management and control. For instance, as M2M communication technology is usable for numerous devices and equipments including cars, trucks, trains, containers, auto-vending machines, gas tanks and the like, its application fields may reach far and wide.

The M2M device makes a report to a base station on a long-term basis. Alternatively, the M2M device makes a report to the base station if an event is triggered. In particular, while the M2M device mostly stays in an idle state, if a long-term cycle returns or an event is triggered, the M2M device awakes and then enters an active state. Moreover, although some of M2M devices may have mobility by being installed on mobile bodies, most of the M2M devices may have less or zero mobility.

The above-mentioned device for performing M2M communications may be variously named one of an M2M device, an M2M communication device, an MTC (machine type communication) device and the like. And, a conventional user equipment may be named an HTC (human type communication) user equipment.

The number of M2M devices will increase gradually in a prescribed network in response to the increasing number of machine application types. The currently discussed machine application types may include (1) security, (2) public safety, (3) tracking and tracing, (4) payment, (5) healthcare, (6) remote maintenance and control, (7) metering, (8) consumer device, (9) POS (Point Of Sales) and fleet Management in security related market, (10) M2M communication of vending machine (11) smart meter for plant and machinery remote monitoring, operating time measurement on measurement on construction plant and machinery and auto-measurement of consumed heat or electricity quantity on construction plant and machinery, (12) surveillance video communication and the like, by which the machine application types may be non-limited. And, there are ongoing discussions on other machine application types. As the number of machine application types increases, the number of M2M communication devices may increase rapidly compared to the number of general mobile communication devices.

In the following description, in a communication system based on a cellular network supportive of the above-mentioned M2M communication, mainly explained are a method for a system to support an M2M communication without using a base station and a method of supporting a communication in case that a user equipment transmits a signal to a base station with a help of a neighbor user equipment due to such a problem as a power problem, a transmit power problem, an interference problem, a channel state problem and the like.

Figure 2:
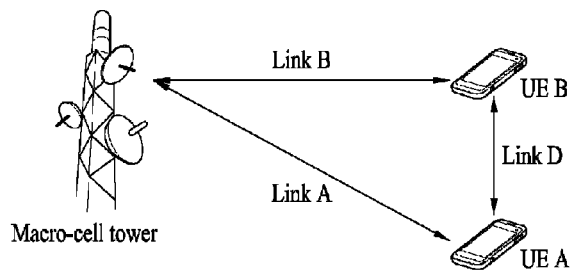
FIG. 2 is a diagram for one example of a wireless communication system supportive of a UE-to-UE (M2M) direct communication.

FIG. 2 is a diagram for one example of a wireless communication system supportive of a UE-to-UE (M2M) direct communication.

Referring to FIG. 2, in case that a signal of a user equipment A is forwarded to a base station with a help of a user equipment B, the user equipment A and the user equipment B shall be named a source user equipment and a target user equipment, respectively. Of course, like the case shown in FIG. 2, since the user equipment B helps the user equipment A in a manner of receiving the signal of the user equipment A and then forwarding it to the base station, it may be preferable that the user equipment B is named a cooperative device. Yet, since the present invention can include an M2M cooperative communication as well as an M2M direct communication, the user equipment B shall be named a target user equipment.

A direct communication architecture shown in FIG. 2 is described in brief as follows. A system having the direct communication architecture according to FIG. 2 includes a user equipment A (i.e., a source user equipment), a user equipment B (i.e., a target user equipment) and a macro cell base station. A control tower configured to control and operate a macro cell can manage a plurality of macro base stations, each of which shall be named a base station in the present specification. Contents of the present invention shall be described using the user equipment A, the user equipment B and the base station included in the system having the direct communication architecture shown in FIG. 2.

Referring to FIG. 2, the user equipment A can transmit a UE-specific signal (e.g., SRS (sounding reference signal) symbol) to the user equipment B and the base station. The base station can share channel estimated values and transmit power configured element estimated values for signals sent by user equipments with a specific user equipment or partial/whole group. Based on this, the base station is able to perform a communication through an M2M power configuration.

<Case that User Equipments are Unable to Identify Each Other>

A transmission format can be defined in advance for transmissions between user equipments. User equipments can use a predefined transmission format (including at least one of resource size & position, coding, modulation scheme and UE-specific ID (identifier) informations). When a base station performs resource allocation (time and frequency region assignment), a user equipment, which needs an M2M communication system, can transmit a signal using the allocated resource. In particular, transmission can be performed using previous SRS (sounding reference symbol) as it is. Alternatively, new definition can be made for the purpose of M2M communication configuration.

A user equipment A can transmit a UE-specific signal (e.g., SRS) to a user equipment B and a base station. Based on a transmission format used for this transmission, the user equipment B can recognize that the corresponding signal is the signal of the user equipment A. In particular, the user equipment A can set a transmit power by targeting neighbor user equipments instead of targeting the base station like SRS. The method of setting a transmit power by targeting neighbor user equipments can be configured in various ways.

In this case, for instance, assume that PSD levels to be used by user equipments are previously determined and that the PSD levels uniquely correspond to transmission formats, respectively. For example, assume that a PSD level combination predetermined with a transmission format and a multi-PSD level is configured and that such information is shared within a wireless communication system in advance. And, assume that information for identifying a user equipment may be included in the transmission format.

For instance, if a user equipment A transmits a signal to a user equipment B with a combination of a specific transmission format and a predetermined PSD (power spectral density) level, the user equipment B can recognize that the user equipment having transmitted the corresponding signal is the user equipment A based on the information of the combination of the PSD level and the transmission format. In doing so, since the PSD level and the transmission format lie in the unique correspondence relation, the user equipment B can acquire informations (e.g., pathloss between user equipment A and user equipment B, NI (noise and interference) level, etc.) necessary for the transmit power configuration of a like between user equipments through the transmission format used by the user equipment A. The acquisition of the pathloss information of the user equipment B or the like can enhance the accuracy of the power control in the system having the pathloss configured as a basic factor in a power control formula. This also provides such an advantage as minimizing an additional interference occurrence of a system by minimizing a surplus power.

Moreover, a UL signal transmission to a user equipment B from a user equipment A can become a method of configuring a user equipment as a minimum power transmission target of the grouping for the usage of a UE-to-UE communication, an M2M communication or the like. In particular, it is possible to make a reporting to a base station by taking this method as a reference for forming a candidate group for a UE-to-UE communication or a grouping for specific purpose. Based on this reporting information, a base station can enable a process for the grouping to proceed.

For the UE-to-UE direct communication, in aspect of reusing an SRS transmitting method and power control in a wireless communication system of the related art, a following method can be taken into consideration. First of all, a base station can inform a user equipment A, a user equipment B and user equipments of a candidate group for M2M communication of an SRS transit power level. The base station can signal the corresponding SRS transmit power level in a manner of configuring the SRS transmit power level as a single-level or a multi-level. If so, the user equipment A can estimate such a channel information as a pathloss for a user equipment, which performs a transmission on an indicated SRS transmit power level, NI level and the like. Based on the estimated channel information, the user equipment A is facilitated to set a transmit power level for the user equipment B.

As another method considerable in aspect of reusing an SRS transmitting method and power control in a wireless communication system of the related art, there is a method for a user equipment to perform an SRS transmission of the related art and to report a corresponding SRS transmit power information to a base station. The base station is able to notify the corresponding SRS transmit power information to a user equipment A (i.e., source user equipment) or user equipments in a group for the usage of M2M or the like. If so, the user equipment A (source user equipment) can compensate for a transmit power loss amount with a user equipment B based on a channel information through an SRS signal transmission of the user equipment B (i.e., target user equipment) and the corresponding SRS transmit power information received from the base station.

A user equipment can set a power for a format of a corresponding transmission to a different user equipment by applying a fractional pathloss compensation based on a pathloss with a base station. In this case, it is reusable without an additional power control configuration in a wireless communication system that uses a pathloss based power control. Yet, if the fractional pathloss compensation scheme is used by a wireless communication system of the related art, it is necessary for a user equipment A to configure a corresponding element discriminated from that of a transmission to a base station for example. In doing so, the user equipment A can consider that a transmit power level for a corresponding transmission format is included and transmitted to a user equipment B. This information is useful for the user equipment B to estimate a pathloss between the user equipment A and the user equipment B and an NI level. The estimated pathloss and the estimated NI level become significant elements for the minimum power settings for the communication between the user equipment A and the user equipment B.

In such a power control scheme of applying a fractional pathloss compensation as 3GPP LTE system, a cell-specific fractional pathloss compensation factor setting of the related art is changed UE-specific or can be set in a manner of overriding into a UE-specific setting value only if necessary like UE-to-UE (or M2M) communication. Moreover, when UE-specific offset terms of a power control of the related art are set, they can be set in consideration of the UE-to-UE communication or an additional UE-specific offset value can be inserted for the UE-to-UE communication only.

Meanwhile, after an initial transmission of a user equipment A has been performed, a transmit power to a user equipment B (i.e., target user equipment) can be adjusted depending on a quality of a received and measured signal. In particular, in case that consecutive NACK (negative acknowledgement) signals or discontinuous transmissions (DTx), of which count is equal to or greater than a predetermined number, occur in the user equipment B or NACK signals or DTx occur over a predetermined rate within a determined time window, the user equipment A (source user equipment) can raise a transmit power level of a transmission to the user equipment B (target user equipment). Moreover, if the NACK signals or DTx do not occur over a predetermined time or count, the user equipment A can lower the transmit power level of the transmission to the user equipment B. In doing so, a signal indicating a presence or non-presence of occurrence of the NACK signal or DTx and an increase/decrease of the transmit power level may be transmitted to the user equipment A (source user equipment) from the user equipment B (target terminal) or may be directly transmitted to the user equipment A (source user equipment) by a base station.

Alternatively, it is able to consider a following method. First of all, a user equipment A (source user equipment) transmits a signal to a base station by the same operation and transmission of a general SRS signal. Secondly, one (e.g., user equipment B (target user equipment)) of neighbor user equipments, which have already obtained informations necessary to receive the transmitted signal from the base station, receives SRS and then transmits a measurement reporting to the base station.

<Case that User Equipments are Unidentifiable Based on UE-Specific Signal Between User Equipments>

Assume that a user equipment B can receive and decode UL transmission signals transmitted by other user equipments (e.g., a neighbor user equipment, etc.). And, assume that the user equipment B identifies other user equipments by receiving signals transmitted by other user equipments and estimates a channel status. In particular, each user equipment basically performs a series of processes including the steps of identifying a user equipment/relay node/base station or the like based on signals received from other user equipments, estimating a channel status by a preset method, and then reporting the corresponding information to a neighbor user equipment and a corresponding base station (e.g., a macro base station, a micro base station, a femto base station, a relay node, etc.). In this case, assume that a reporting format follows a predetermined structure. Such a reporting can be transmitted on a physical channel or by upper layer signaling.

In case that a communication of M2M type such as client cooperation is not an independent transmission but a portion of a whole transmitting process, a process for channel estimation in the following is possible. Each user equipment can decode a fractional reference signal for estimating a channel status only instead of decoding a whole signal transmitted in UL. In this case, the reference signal may be excluded from an additional transmission after the decoding. In case that a signal transmitted between user equipments is encrypted for security, it is able to check CRC to check whether a signal reception is correctly performed. In doing so, CRC attachment may be excluded from an additional transmission after decoding. Moreover, in doing so, the used CRC may include a CRC of a type different from that of the CRC included in the encrypted signal.

User equipments are awake in an SRS transmitting interval and ready to perform estimation. And, all of the neighbor user equipments can simultaneously transceive signals in a cell-specific transmitting interval. Moreover, only necessary user equipments can transceive signals. In this case, the transceiving can proceed in a manner of being limited to a group or user equipments having sent/received request messages.

Based on a signal (e.g., UE A-specific signal) received from a user equipment A, a user equipment B can estimate a channel state by estimating a pathloss with the user equipment A and is able to report such a channel information as the estimated pathloss and the like to a base station. Simultaneously, based on the signal (e.g., UE A-specific signal) received from the user equipment A, the base station can estimate a channel state through the pathloss estimation with the user equipment A as well. Channel information transmitted to the base station by the user equipment B can include SNR/SINR (signal to noise ratio/signal to interference plus noise ratio), pathloss & NI level, location information transmit power related elements (e.g., PSD, total transmit power level) and the like. Based on the above-mentioned elements, the channel information can be configured entirely or in part if necessary.

When a direct communication is performed between a user equipment A and a user equipment B, a base station can transmit a transmit power adjusting factor for a transmit power level to the user equipment A based on the channel information reported by the user equipment B. Alternatively, the user equipment B can directly transmit a transmit power adjusting factor to the user equipment A based on the channel information estimated by the user equipment B. Generally, in case of a UE-to-UE cooperative transmission, it may be preferable that the base station transmits the transmit power adjusting factor to the user equipment A. Yet, in case of a UE-to-UE direct communication, it may be preferable that the user equipment B transmits the transmit power adjusting factor to the user equipment A. Since the user equipment B or the base station can transmit the transmit power adjusting factor to the user equipment A, in order to discriminate the transmission from the user equipment B and the transmission from the base station from each other, the base station transmits the transmit power adjusting factor to the user equipment A using a message type of the related art or the user equipment B can inform the user equipment A of the transmit power adjusting factor in a manner of configuring an independent message for the UE-to-UE cooperative communication. For instance, when the M2M connection managed by the base station is configured, the transmit power adjusting factor can be indicated in a manner of being included in a corresponding message to be sent.

Meanwhile, when a user equipment A is already aware of the pathloss and the NI level with a user equipment B, it is able to determine a transmit power level of a transmission to the user equipment B without a process for receiving a transmit power adjusting factor from a base station. Yet, in this case, when the transmit power adjusting factor is received from the base station and then transmitted, the step of applying the received transmit power adjusting factor is not excluded.

Alternatively, it is possible for a user equipment A to set a power based on a location information of a user equipment B. Yet, in this case, it is necessary to apply NI level and additional margin for the corresponding transmission resource. And, this element can be signaled to the user equipment A.

The transmit power adjusting factor may include a value for a parameter (e.g., a pathloss between a user equipment A and a user equipment B), which is not known to the user equipment A, in a substantial power control formula, a value to help the user equipment A to analogize the value for the parameter, an absolute power value to be substantially transmitted, or a relative difference for a previous transmission value.

A base station can set an SRS transmit power as a reference power. The base station can transmit the reference power and the transmit power adjusting factor to a user equipment A. The user equipment A determines a power for a first signal transmission by applying the transmit power adjusting factor signaled from the base station. The user equipment A receives the transmit power adjusting factor from a target user equipment (e.g., the user equipment B shown in FIG. 2) which performs the direct communication after the first signal transmission and is then able to set a transmit power of a transmission to a user equipment B by applying the received transmit power adjusting factor. Alternatively, the user equipment A receives the transmit power adjusting factor from the base station after the direct communication with the user equipment B and is then able to set a transmit power of a transmission to the user equipment B. In case of receiving the transmit power adjusting factor from the user equipment B in addition, a power setting method for a transmission to the user equipment A is necessary as well.

In the foregoing description, a series of the processes of the neighbor user equipments can be categorized into a case of knowing the pathloss and NI (level) and a case of not knowing the pathloss and NI (level).

For instance, in case that the user equipment B knows the pathloss and NI level with the user equipment A, the user equipment B sets a transmit power based on the pathloss and the NI level and is then able to transmit a signal to the user equipment A in accordance with the set transmit power. Once an initial communication between user equipments is performed, a next transmission can be controlled by sending a power adjusting factor through a message exchanged in-between.

On the contrary, in case that the user equipment B does not know the pathloss and NI level with the user equipment A, the user equipment A transmit a transmission PSD level information in a manner that the corresponding information is included in a first signal transmission. Alternatively, since the user equipment A knows the pathloss and NI level with the user equipment B, the user equipment A can transmit the corresponding information in a manner that the corresponding information is contained in the initial transmission content or configured as a separate message. When at least one target user equipment for an M2M communication exists, a power may be set based on a bigger pathloss component.

Figure 3:
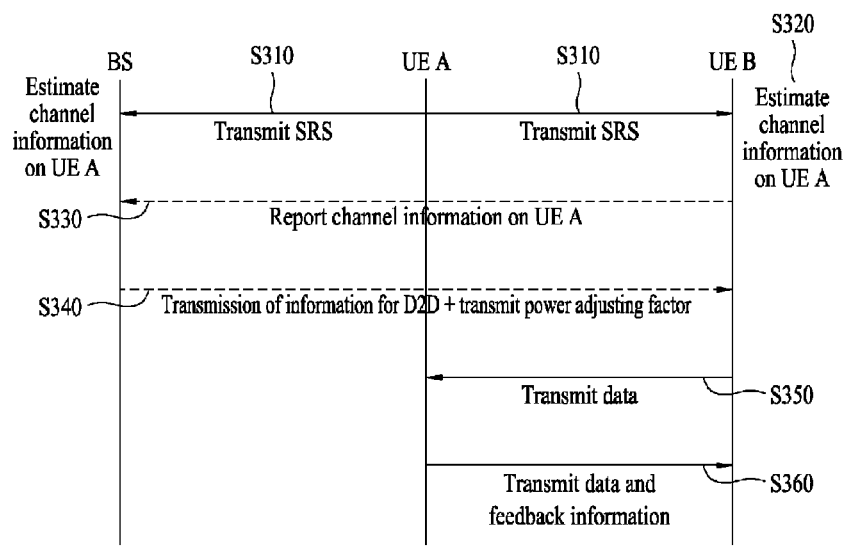
FIG. 3 is a diagram to describe a process for adjusting a transmit power in a manner that a source user equipment reports information on a target user equipment to a base station and that the base station sends a transmit power adjusting factor to the source user equipment.

FIG. 3 is a diagram to describe a process for adjusting a transmit power in a manner that a source user equipment reports information on a target user equipment to a base station and that the base station sends a transmit power adjusting factor to the source user equipment.

Referring to FIG. 3, assume that a source user equipment includes a user equipment A. Assume that a target user equipment includes a user equipment B. The user equipment A can transmit a UE A-specific signal (e.g., SRS signal) to the user equipment B and a base station [S310]. Based on the UE-A specific signal (e.g., SRS signal) received from the user equipment A, the user equipment B is able to estimate a channel state [S320]. The user equipment B is able to transmit a channel information reporting for the user equipment A to the base station [S330].

If so, the base station can transmit an information for a UE-to-UE direct communication and a transmit power adjusting factor to the user equipment B [S340]. Thereafter, based on the channel state information estimated in the step S320, the user equipment can determine a UL transmit power for a data transmission to the user equipment A. And, the user equipment sets a transmit power based on the information for the UE-to-UE direct communication and the transmit power adjusting factor, which are received from the base station, and is then able to transmit data to the user equipment A with the set transmit power [S350]. If so, the user equipment A can transmit feedback information and data related to the former data received from the user equipment B to the user equipment B [S360].

On the other hand, unlike the step S340, the base station may transmit an information for a UE-to-UE direct communication and a transmit power adjusting factor to the user equipment A. If so, the user equipment A can transmit them to the user equipment B. Alternatively, the base station may transmit an information for a UE-to-UE direct communication and a transmit power adjusting factor to both of the user equipment A and the user equipment B.

Figure 4:
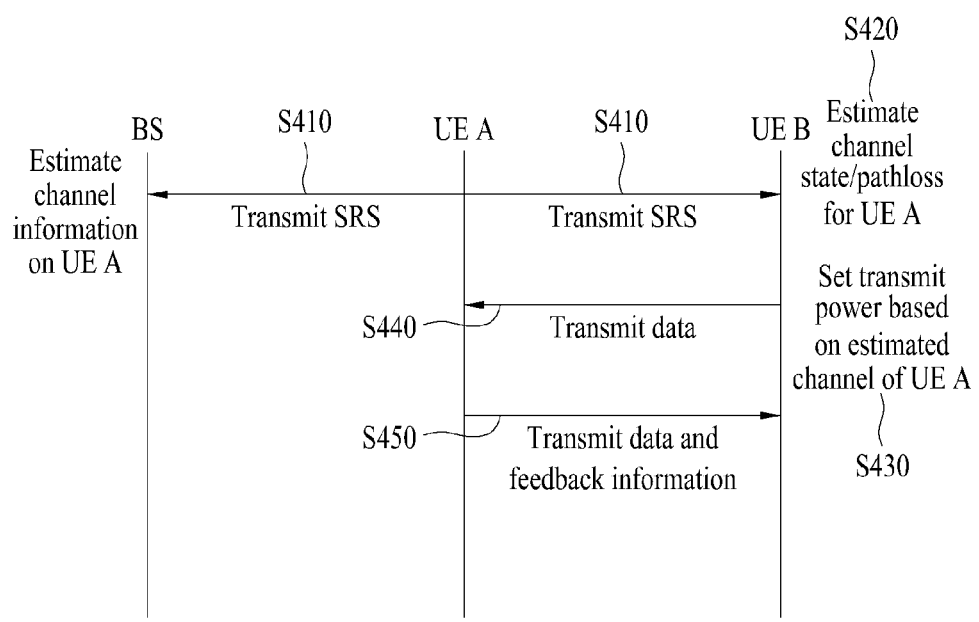
FIG. 4 is a diagram to describe a process for obtaining information for determining a transmit power between a source user equipment and a target user equipment by itself and a process including a supportive structure.

FIG. 4 is a diagram to describe a process for obtaining information for determining a transmit power between a source user equipment and a target user equipment by itself and a process including a supportive structure.

Referring to FIG. 4, assume that a source user equipment includes a user equipment A. Assume that a target user equipment includes a user equipment B. The user equipment A can transmit a UE A-specific signal (e.g., SRS signal) to the user equipment B and a base station [S410]. Based on the UE-A specific signal (e.g., SRS signal) received from the user equipment A, each of the base station and the user equipment B is able to estimate a channel state [S420]. In this case, the channel state estimation may include estimation of a pathloss between the user equipment A and the user equipment B, NI level and the like. In particular, the user equipment B can obtain channel information (e.g., pathloss, NI level, etc.) on the user equipment A in direct [S420]. If so, the user equipment B can set a transmit power of a transmission to the user equipment A based on the estimated channel information of the user equipment A [S430].

If so, the user equipment A can transmit feedback information and data related to the former data received from the user equipment B to the user equipment B [S440]. In this case, information on an offset value, which is to be applied to the transmit power setting by the user equipment B, can be included in the feedback information. Thereafter, the user equipment B sets a transmit power by applying the offset value included in the feedback information and is then able to transmit a next signal to the user equipment A with the set transmit power.

A user equipment can set a transmit power for a UE-to-UE direct communication using Formula 1 mentioned in the foregoing description. Based on the SRS transmit power using Formula 1, an initial power for the UE-to-UE direct communication can be set by applying a transmit power adjusting factor received from a base station. Alternatively, in case that a UE-to-UE pathloss and an NI level can be estimated, it is able to set a UE-to-UE transmit power by applying them to and 'NI' in Formula 1.

Of course, despite using Formula 2 as it is, components can be signaled or reused for a UE-to-UE communication. And, an SRS transmission can be performed between user equipments. Hence, when a power for a UE-to-UE SRS transmission is set, the power can be set in a manner of applying a pathloss, an NI level and the like used for a data transmission. And, an SRS setting parameter between a user equipment and a base station among UE-to-UE SRS power setting parameters can include a signaled value optimized for a UE-to-UE communication or a preset value.

The above-described method is applicable to a power control different from that of a control channel or a data channel. For instance, a method of using a power control formula of LTE/LTE-A system is applicable to using the above-described method. For example, a transmit power can be set in a following manner. First of all, an estimated value is applied to a pathloss part which is an individual power control channel applied common element. Secondly, other parameters are indicated by a base station in UE-to-UE connection/scheduling or preset values are applied.

The various embodiments of the present invention mentioned in the foregoing description help the transmit power settings for a UE-to-UE direct communication and bring considerable effects in controlling interference amounts and reducing power consumption.

Although the contents of the present invention are described with reference to IEEE 802.16m system, they are applicable to various kinds of communication systems including 3GPP LTE system, 3GPP LTE-A system and the like.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method of determining a transmit power for a UE-to-UE UL signal transmission in a wireless communication system supportive of a UE-to-UE communication and apparatus therefor are industrially applicable to various kinds of wireless access systems including 3GPP LTE, 3GPP LTE-A, IEEE 802 and the like.

What is claimed is:
1. A method of determining an uplink transmit power by a first user equipment for an uplink signal transmission to a second user equipment in a wireless communication system supportive of a UE-to-UE communication, the method comprising:
estimating a channel state based on a second user equipment-specific signal received from the second user equipment;
transmitting estimated channel information to a base station;

receiving a message including information on a transmit power adjusting factor from the base station or the second user equipment; and determining a transmit power for the uplink signal transmission to the second user equipment based on the received message.

2. The method of claim 1, wherein the first user equipment identifies the second user equipment by the second user equipment-specific signal.

3. The method of claim 2, wherein the second user equipment-specific signal corresponds to an SRS (sounding reference symbol) signal.

4. The method of claim 2, wherein the message further comprises information for the UE-to-UE communication.

5. The method of claim 1, further comprising transmitting an uplink signal to the second user equipment at the determined uplink transmit power.

6. A method of determining an uplink transmit power by a first user equipment for an uplink signal transmission to a second user equipment in a wireless communication system supportive of a UE-to-UE communication, the method comprising:

estimating a channel state based on a second user equipment-specific signal received from the second user equipment;

determining a transmit power for the uplink signal transmission to the second user equipment based on the estimated channel state; and transmitting an uplink signal to the second user equipment in accordance with the determined transmit power.

7. The method of claim 6, the channel state estimating further comprising estimating at least one of a pathloss between the first user equipment and the second user equipment and an NI (noise and interference) level.

8. A first user equipment for determining a transmit power for an uplink signal transmission to a second user equipment in a wireless communication system supportive of a UE-to-UE communication, comprising:

a processor configured to estimate a channel state based on a second user equipment-specific signal received from the second user equipment;

a transmitter configured to transmit estimated channel information to a base station; and a receiver configured to receive a message including information on a transmit power adjusting factor from the base station or the second user equipment, wherein the processor determines transmit power for the uplink signal transmission to the second user equipment based on the received message.

9. The first user equipment of claim 8, wherein the transmitter transmits an uplink signal to the second user equipment in accordance with the determined transmit power.

10. The first user equipment of claim 8, wherein the message further comprises information for the UE-to-UE communication.

11. A first user equipment for determining a transmit power for an uplink signal transmission to a second user equipment in a wireless communication system supportive of a UE-to-UE communication, comprising:

a processor configured to estimate a channel state based on a second user equipment-specific signal received from the second user equipment, the processor configured to determine transmit power for the uplink signal transmission to the second user equipment based on the estimated channel state; and a transmitter configured to transmit an uplink signal to the second user equipment in accordance with the determined transmit power.

12. The first user equipment of claim 11, wherein the processor estimates at least one of a pathloss between the first user equipment and the second user equipment and an NI (noise and interference) level.

* * * * *